United States Patent
Kitamura

(10) Patent No.: US 11,125,871 B2
(45) Date of Patent: Sep. 21, 2021

(54) AZIMUTH ESTIMATION DEVICE AND METHOD

(71) Applicant: DENSO CORPORATION, Kariya (JP)

(72) Inventor: Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/996,622

(22) Filed: Aug. 18, 2020

(65) Prior Publication Data
US 2020/0379100 A1  Dec. 3, 2020

Related U.S. Application Data

(63) Continuation of application No. PCT/JP2019/005315, filed on Feb. 14, 2019.

(30) Foreign Application Priority Data

Feb. 20, 2018 (JP) .............................. JP2018-027907

(51) Int. Cl.
  *G01S 13/58* (2006.01)
  *G01S 13/931* (2020.01)
  (Continued)

(52) U.S. Cl.
  CPC ............ *G01S 13/584* (2013.01); *G01S 13/72* (2013.01); *G01S 13/931* (2013.01); *G01S 13/18* (2013.01);
  (Continued)

(58) Field of Classification Search
  CPC ...... G01S 13/584; G01S 13/532; G01S 13/64; G01S 13/18; G01S 13/53; G01S 13/60;
  (Continued)

(56) References Cited

U.S. PATENT DOCUMENTS

| 7,486,230 B2 * | 2/2009 | Takano | .................. G01S 13/42 |
| | | | 342/147 |
| 2003/0151544 A1 * | 8/2003 | Nishimura | .............. G01S 7/354 |
| | | | 342/70 |

(Continued)

FOREIGN PATENT DOCUMENTS

| JP | 2006-145251 A | 6/2006 |
| JP | 2010-271337 A | 12/2010 |
| JP | 2017-090229 A | 5/2017 |

*Primary Examiner* — Erin F Heard
*Assistant Examiner* — Michael W Justice
(74) *Attorney, Agent, or Firm* — Maschoff Brennan

(57) ABSTRACT

In an azimuth estimation device, a center generation unit configured to generate, for each peak bin extracted by the extraction unit, a center matrix which is a correlation matrix obtained using values of the same peak bin collected from all of transmitting/receiving channels. A surrounding generation unit is configured to generate, for each of one or more surrounding bins of each of the peak bins, a surrounding matrix which is a correlation matrix obtained using values of the same surrounding bin collected from all of the transmitting/receiving channels. An integration unit is configured to generate, for each peak bin, an integrated matrix which is a correlation matrix obtained by weighting and adding the center matrix and the one or more surrounding matrices. An estimation unit is configured to execute an azimuth estimation calculation using the integrated matrix generated by the integration unit.

4 Claims, 10 Drawing Sheets

(51) Int. Cl.
*G01S 13/72* (2006.01)
*G01S 13/44* (2006.01)
*G01S 13/53* (2006.01)
*G01S 13/60* (2006.01)
*G01S 13/532* (2006.01)
*G01S 13/64* (2006.01)
*G01S 13/18* (2006.01)

(52) U.S. Cl.
CPC ....... *G01S 13/4418* (2013.01); *G01S 13/4427* (2013.01); *G01S 13/53* (2013.01); *G01S 13/532* (2013.01); *G01S 13/60* (2013.01); *G01S 13/64* (2013.01)

(58) Field of Classification Search
CPC .. G01S 13/72; G01S 13/4418; G01S 13/4427; G01S 13/931
USPC ....... 342/108, 140, 107, 113, 133, 139, 146, 342/147
See application file for complete search history.

(56) References Cited

U.S. PATENT DOCUMENTS

| | | | |
|---|---|---|---|
| 2006/0007036 A1 | 1/2006 | Natsume et al. | |
| 2007/0120730 A1* | 5/2007 | Takano | G01S 13/42 342/70 |
| 2007/0285315 A1* | 12/2007 | Davis | H01Q 3/2629 342/377 |
| 2010/0271254 A1* | 10/2010 | Kanamoto | G01S 13/931 342/27 |
| 2011/0074620 A1* | 3/2011 | Wintermantel | G01S 7/285 342/70 |
| 2014/0145871 A1* | 5/2014 | Asanuma | G01S 13/723 342/128 |
| 2015/0204966 A1* | 7/2015 | Kishigami | G01S 13/02 342/189 |
| 2017/0082730 A1* | 3/2017 | Kishigami | H01Q 21/061 |

* cited by examiner

AZIMUTH ESTIMATION DEVICE AND METHOD

CROSS REFERENCE TO RELATED APPLICATION

The present application is based on Japanese Patent Application No. 2018-027907 filed on Feb. 20, 2018, the description of which is incorporated herein by reference.

BACKGROUND

Technical Field

The present disclosure relates to a technique for executing an azimuth estimation calculation using correlation matrices.

RELATED ART

Known methods used in radar devices to calculate the azimuth of a target by generating correlation matrices from received signals obtained from a plurality of antennas and using the correlation matrices include high-resolution direction-of-arrival estimation methods such as MUSIC and ESPRIT. MUSIC is an abbreviation for Multiple Signal Classification, and ESPRIT is an abbreviation for Estimation of Signal Parameters via Invariance Techniques. Hereinafter, these methods are referred to as high-resolution methods.

DESCRIPTION OF SPECIFIC EMBODIMENTS

Figure 1A:
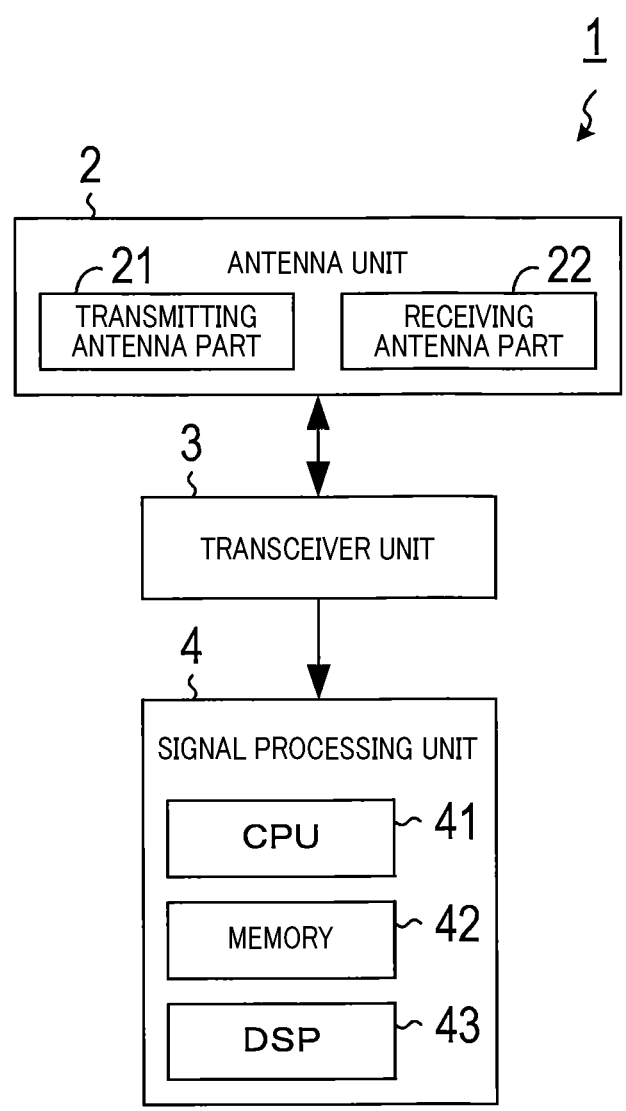
FIG. 1A is a block diagram of an azimuth estimation device.
Figure 1B:
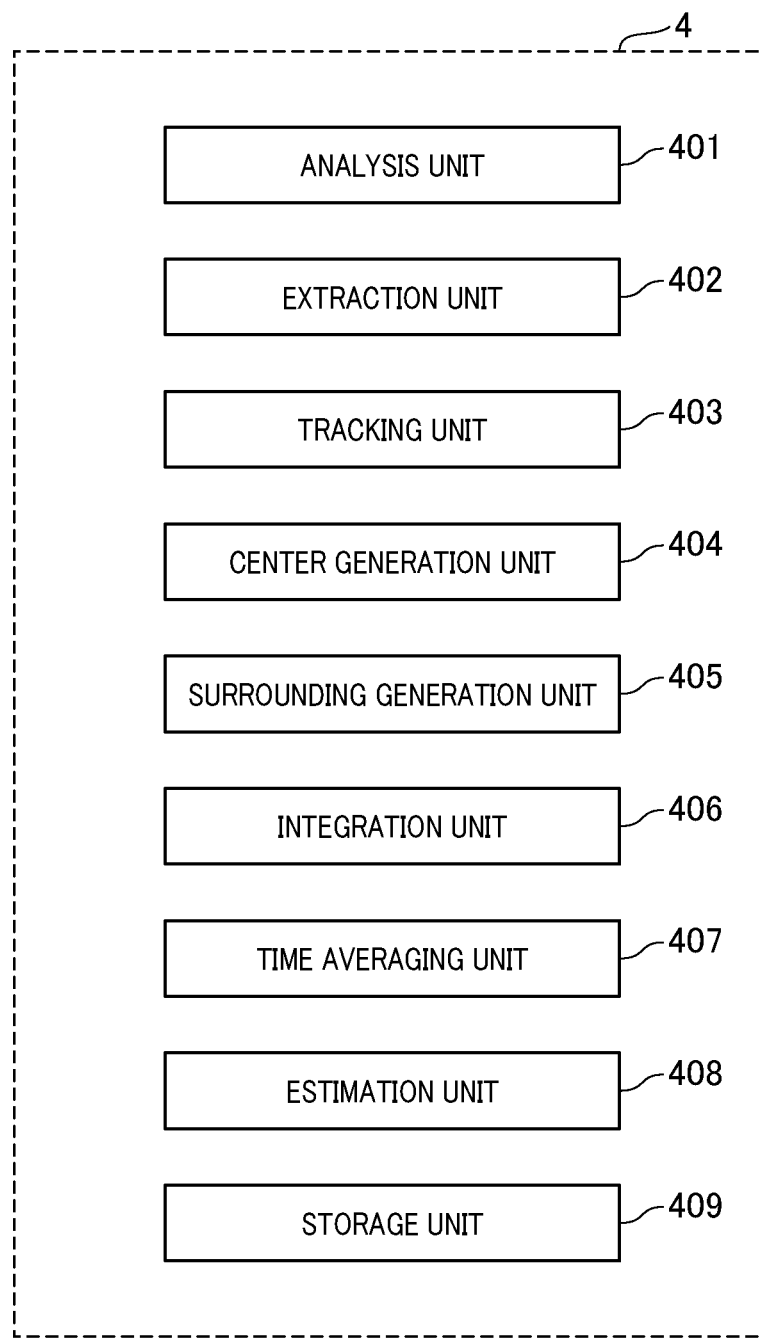
FIG. 1B is a functional block diagram of a signal processing unit.

In a high-resolution method, in order to separate the azimuths of a plurality of targets, it is necessary to suppress the values of the off-diagonal elements of the correlation matrix, which are cross-correlation components of the correlation matrix. JP-A-2017-90229 describes using spatial averaging to suppress the cross-correlation components. In spatial averaging, an antenna array in which antennas are arranged at equal intervals (hereinafter referred to as an evenly spaced array) is divided into a plurality of small sub-arrays having the same similar shape. A correlation matrix is generated for each sub-array, and the average of the generated correlation matrices is obtained. Besides this, time averaging is also known in which a plurality of correlation matrices obtained by performing the measurement multiple times within a short time are averaged. In either case, it is necessary to secure a certain number of snapshots which is the number of correlation matrices to be averaged.

However, as a result of detailed examination by the discloser, the following issues were found regarding the above known technique.

That is, spatial averaging has an issue that it can only be applied to cases where the receiving array antennas are an evenly spaced array that can be divided into small sub-arrays having the same similar shape.

Further, when the FCM method is used as the modulation method of the radar, time averaging cannot be used. FCM is an abbreviation for Fast-Chirp Modulation. That is, in the FCM method, a chirp whose frequency changes with time is repeatedly transmitted, and, for each channel, fast Fourier transform is performed on each chirp to separate the target's distance. Further, for each channel, the values of the same frequency bin of each distance spectrum are collected from all the chirps and FFT is performed to separate the target's speed. Thus, since it is necessary to process every chirp individually by FFT in FCM, it is impossible to use time averaging in which a plurality of correlation matrices calculated using a plurality of chirps are averaged.

In view of the foregoing, it is desired to have a method of suppressing the cross-correlation of a correlation matrix to improve the accuracy of azimuth separation of a plurality of targets and the accuracy of azimuth estimation.

One aspect of the present disclosure provides an azimuth estimation method including an analysis step, an extraction step, a center generation step, a surrounding generation step, an integration step, and an estimation step.

In the analysis step, a frequency spectrum is generated for each of a plurality of transmitting/receiving channels by frequency-analyzing signals obtained from the transmitting/receiving channels. In the extraction step, a peak frequency bin is extracted as a peak bin from the frequency spectra generated in the analysis step. In the center generation step, for each peak bin extracted in the extraction step, a center matrix is generated which is a correlation matrix obtained using values of the same peak bin collected from all of the transmitting/receiving channels. In a surrounding generation step, for each of one or more surrounding bins of each of the peak bins, a surrounding matrix is generated which is a correlation matrix obtained using values of the same surrounding bin collected from all of the transmitting/receiving channels. The one or more surrounding bins of each peak bin are one or more frequency bins existing within a preset range centered at the corresponding peak bin. In the integration step, for each peak bin, an integrated matrix is generated by weighting and adding the center matrix generated in the center generation step and the one or more surrounding matrices generated in the surrounding generation step. In the estimation step, an azimuth estimation calculation is executed using the integrated matrix generated in the integration step.

Another aspect of the present disclosure provides an azimuth estimation device including an analysis unit, an extraction unit, a center generation unit, a surrounding generation unit, an integration unit, and an estimation unit. The units of the azimuth estimation device perform processes similar to those of the steps of the azimuth estimation method, that is, the analysis step, the extraction step, the center generation step, the surrounding generation step, the integration step, and the estimation step, respectively.

According to such a configuration, the cross-correlation components of a correlation matrix can be reduced even when an unevenly-spaced antenna array is used, or even when the modulation method used requires that the number of snapshots is no larger than 1 as in FCM, for example. As a result, it is possible to improve the estimation accuracy by an azimuth estimation calculation using a correlation matrix such as MUSIC.

Hereinafter, some embodiments of the disclosure will be described with reference to the drawings. In order to facilitate understanding of the description, the same structural elements in the drawings share the same reference signs wherever possible, and overlapping description is omitted.

1. Configuration

An azimuth estimation device 1 shown in FIG. 1A is a so-called millimeter wave radar device which is mounted to a vehicle to detect various targets around the vehicle using millimeter waves. The azimuth estimation device 1 includes a signal processing unit 4. The azimuth estimation device 1 may further include an antenna unit 2 and a transceiver unit 3.

The antenna unit 2 includes a transmitting antenna part 21 and a receiving antenna part 22. The transmitting antenna part 21 has one or more antennas used for transmission of millimeter waves. The receiving antenna part 22 has one or more antennas used for receipt of reflected waves. At least one of the transmitting antenna part 21 and the receiving antenna part 22 has a plurality of antennas.

That is, assuming that a combination of an antenna belonging to the transmitting antenna part 21 and an antenna belonging to the receiving antenna part 22 forms a transmitting/receiving channel, the antenna unit 2 is configured to have a plurality of transmitting/receiving channels. In this embodiment, it is assumed that the antenna unit includes one antenna belonging to the transmitting antenna part 21 and L antennas belonging to the receiving antenna part 22, and L1 transmitting/receiving channels. L1 is an integer greater than or equal to 2. Note that the intervals of the antennas belonging to the transmitting antenna part 21 and the intervals of the antennas belonging to the receiving antenna part 22 may be even intervals or uneven intervals.

The transceiver unit 3 includes an analog circuit that transmits a transmission signal modulated by the FCM method via the transmitting antenna part 21. The transceiver unit 3 includes an analog circuit that generates, for each of the transmitting/receiving channels, a beat signal indicating the frequency difference between the transmission signal and the received signal based on the received signal received via the receiving antenna part 22. Further, the transceiver unit 3 includes an AD converter that performs analog-digital conversion on the beat signal generated for each transmitting/receiving channel, and outputs the AD converted data output from the AD converter to a signal processing unit 4.

Figure 2:
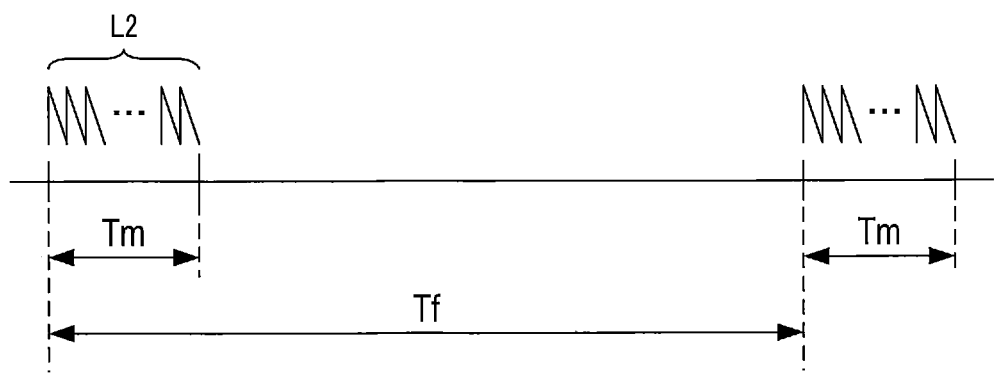
FIG. 2 is an illustration of the modulation pattern of a transmission signal.

Specifically, as shown in FIG. 2, assuming that the measurement cycle Tf is one frame, the transceiver unit 3 continuously transmits, for a preset number of repetitions of L2, a chirp whose frequency changes linearly with time during a measurement time Tm at the beginning of each frame. The measurement cycle Tf may be 50 ms, for example. The measurement time Tm may be 10 ms, for example. The number of repetitions L2 may be 256 times, for example.

The signal processing unit 4 includes a microcomputer including a CPU 41 and a semiconductor memory such as RAM or ROM (hereinafter also referred to as memory 42). Further, the signal processing unit 4 includes a digital signal processor (hereinafter also referred to as DSP) 43 that implements fast Fourier transform (hereinafter also referred to as FFT) by hardware. The DSP 43 is a general-purpose hardware arithmetic unit. However, the DSP 43 does not necessarily need to be a general-purpose device.

The various functions of the signal processing unit 4 other than the DSP 43 are realized by the CPU 41 by executing a program stored in a non-transitory tangible recording medium. In this embodiment, the memory 42 corresponds to the non-transitory tangible recording medium for storing the program. Further, a method corresponding to the program is executed by execution of the program. The signal processing unit 4 may include one or more microcomputers.

The way of realizing the functions of the signal processing unit 4 other than the DSP 43 is not limited to software, and a part or all of the functions may be realized by using one or more hardware components. For example, when such a function is to be realized by an electronic circuit which is hardware, the electronic circuit may be realized by a digital circuit, an analog circuit, or a combination thereof. Further, the function of the DSP 43 may be realized by software.

2. Target Detection Processing

Figure 3:
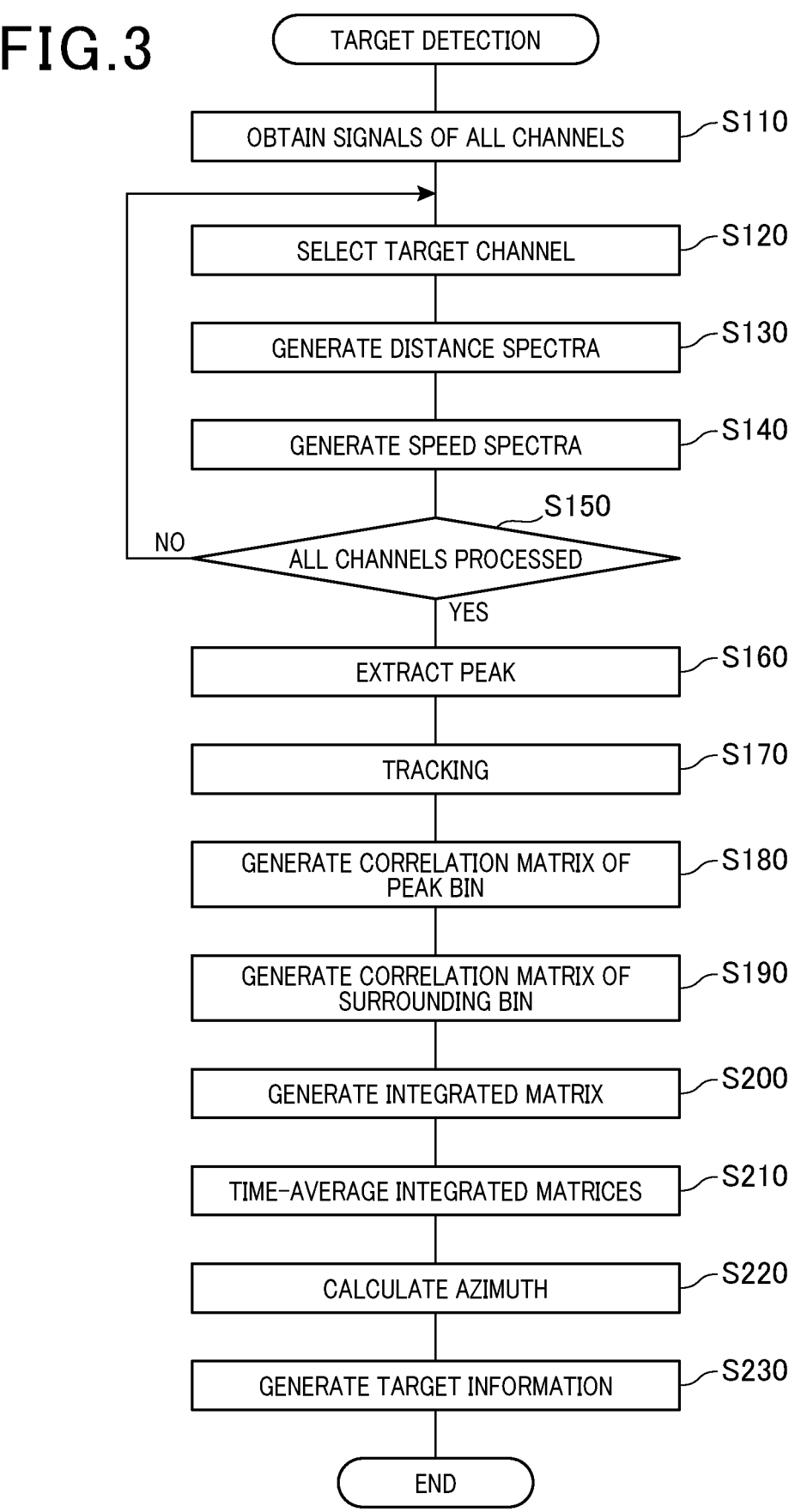
FIG. 3 is a flowchart of target detection processing.

The target detection processing executed by the CPU 41 of the signal processing unit 4 will now be described with reference to the flowchart of FIG. 3.

This process is repeatedly executed every processing cycle with a measurement cycle (period) of Tf.

When this process is started, in step S110, the CPU 41 acquires AD converted data obtained by AD converting the beat signal from each of the L1 transmitting/receiving channels.

In step S120, the CPU 41 selects, as the target channel, one of the L1 transmitting/receiving channels for which the processing of steps S130 to S160 described below has not been executed.

In step S130, the CPU 41 uses the DSP 43 on the AD converted data of the target channel to perform an FFT for each of the L2 chirps, thereby generating L2 FFT spectra. Note that, in the FFT, the data to be processed is multiplied by a preset window function. Since the frequencies of the FFT spectra generated here are associated with the distance to the target, they are referred to as distance spectra in the following. The frequency bins in the distance spectrum are referred to as distance bins. In this embodiment, the number of distance bins is Nd.

In step S140, the CPU 41 uses the DSP 43 to perform the FFT on M pieces of data belonging to the same distance bin collected from the L2 distance spectra generated in step S130. This FFT processing is executed for each of the Nd distance bins included in the distance spectra to generate Nd FFT spectra. Note that, in the FFT, the data to be processed is multiplied by a preset window function. Since the frequencies of the FFT spectra generated here are associated with the relative speed of the host vehicle to the target, they are referred to as speed spectra in the following. The frequency bins in the speed spectrum are referred to as speed bins. In this embodiment, the number of speed bins is Nv.

Figure 4:
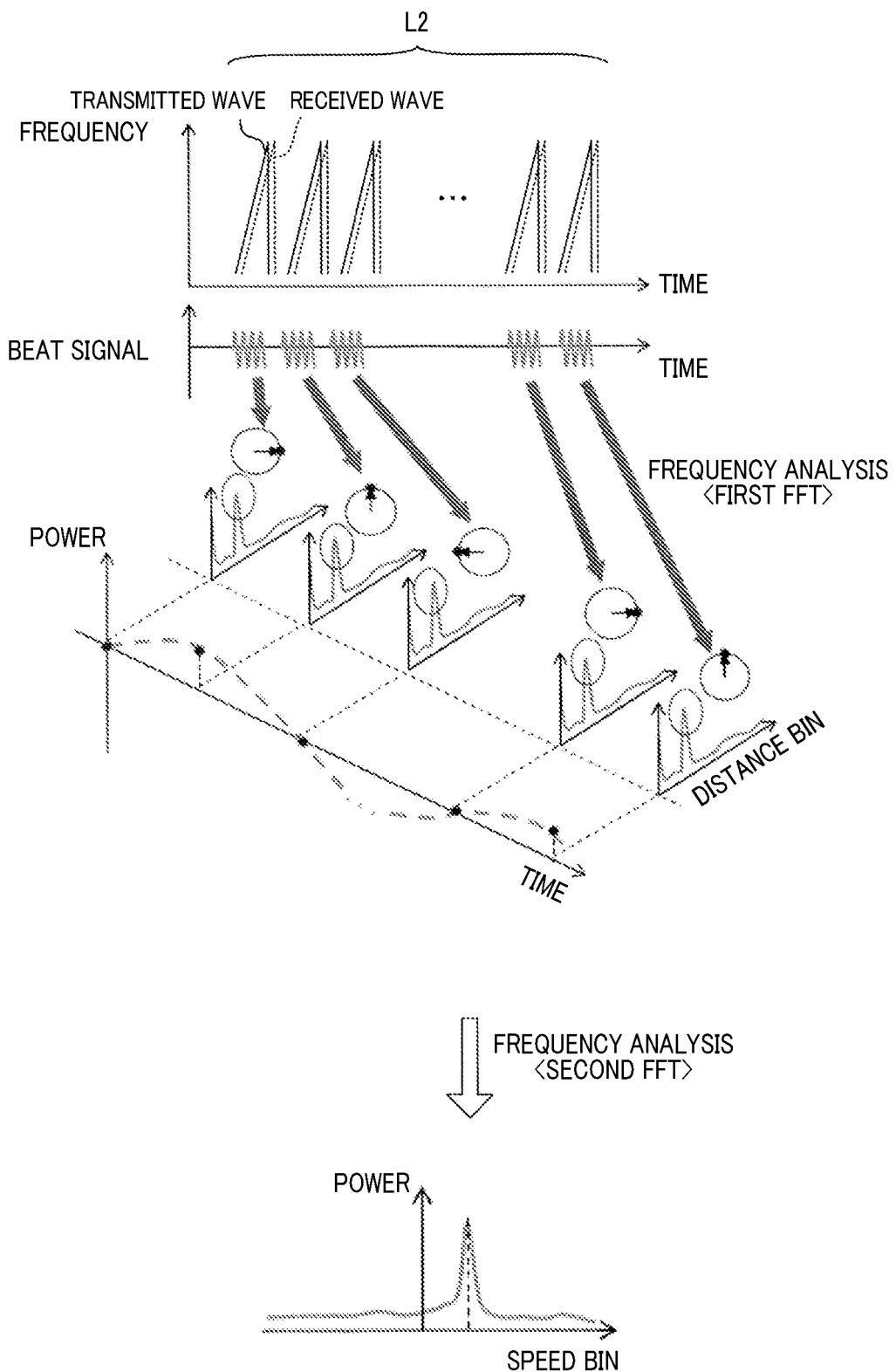
FIG. 4 is an illustration of a relationship between distance spectra and speed spectra.

As shown in FIG. 4, since the phase of a beat signal based on the same target having a constant relative speed with respect to the host vehicle changes with time at a constant rate according to the relative speed, a different value is detected for each chirp. As a result, by collecting the data of the same distance bin and performing the FFT, a frequency component corresponding to the relative speed is extracted.

The two-dimensional FFT spectrum represented by Nd speed spectra, generated for each distance bin, has Nd×Nv frequency bins and two axes, namely, a distance axis and a relative speed axis, and it will be simply referred to as a two-dimensional spectrum in the following. The bins of a two-dimensional spectrum are referred to as two-dimensional bins.

In step S150, the CPU 41 determines whether the above-described processing of steps S130 to S140 has been executed for all of the L1 transmitting/receiving channels. The CPU 41 returns to step S120 if there is an unprocessed transmitting/receiving channel, and proceeds to step S160 if all transmitting/receiving channels have been processed.

In step S160, the CPU 41 extracts two-dimensional bins at which peaks are detected as peak bins from the L1 two-dimensional spectra generated for each transmitting/receiving channel. In this embodiment, the number of detected peak bins is P.

In step S170, the CPU 41 estimates the two-dimensional bins at which peak bins will be detected in the current processing cycle, based on the peak bins detected in the previous processing cycle. Further, if the distance between a detected peak bin and an estimated peak bin on the two-dimensional spectrum is within a threshold range, the CPU 41 associates the peak bin as a peak bin that is based on the same object. This processing is the so-called tracking technique.

In step S180, the CPU 41 generates, for each of the P peak bins detected in step S160, a correlation matrix that represents the correlation of the transmitting/receiving channels, based on the L1 data belonging to the same peak bin collected from each of the L1 two-dimensional spectra. This correlation matrix is referred to as a center matrix. Note that the correlation is represented by a coefficient indicating the degree of similarity of signals obtained in different channels. The closer the absolute value of the coefficient is to 0, the weaker the correlation, and the closer the absolute value of the coefficient is to 1, the stronger the correlation.

In step S190, the CPU 41 extracts, for each of the P peak bins, a plurality of two-dimensional bins existing around the peak bin of interest as surrounding bins, and for each of the extracted surrounding bins, a correlation matrix is generated by a method similar to that of the center matrix described in connection to step S180. This correlation matrix is referred to as a surrounding matrix.

Figure 5:
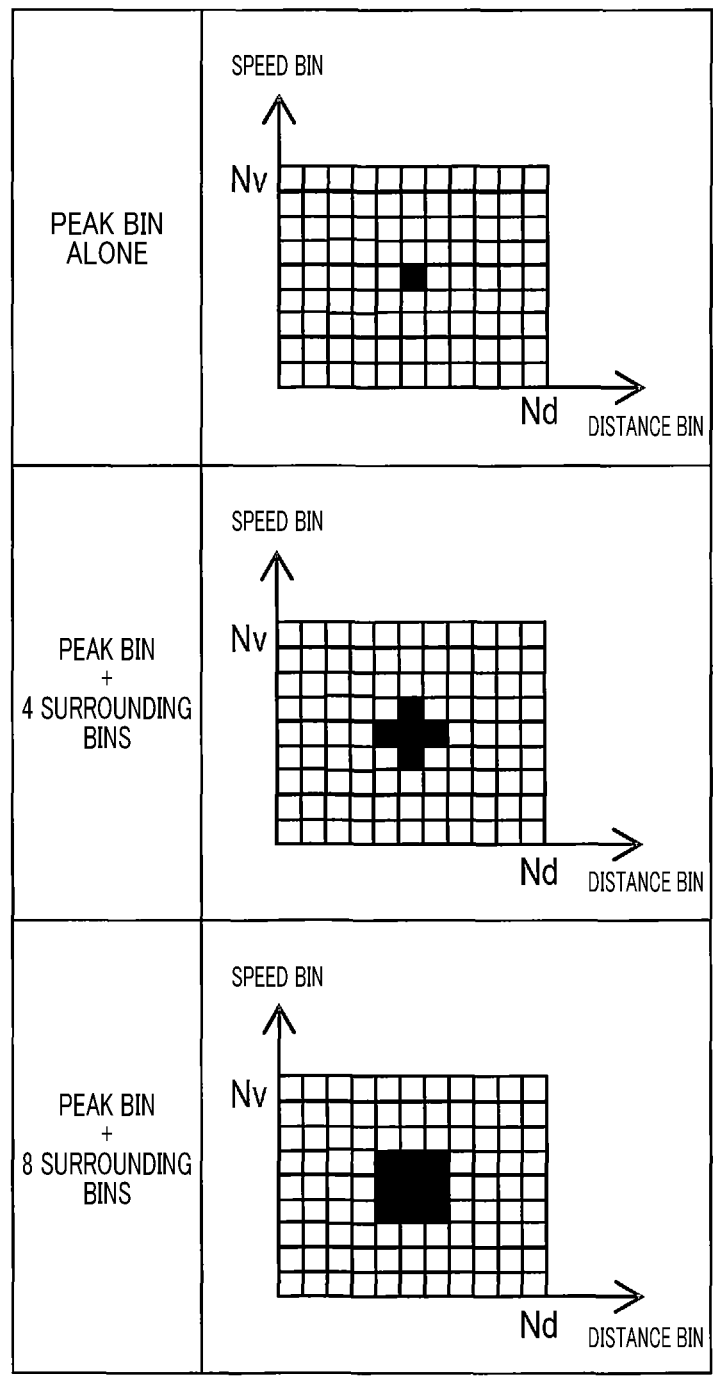
FIG. 5 is an illustration of examples of a peak bin and surrounding bins on a two-dimensional spectrum.

For example, as shown in the middle part of FIG. 5, the surrounding bins may include a total of four bins, namely, two bins adjacent to the peak bin in the speed bin direction and two bins adjacent to the peak bin in the distance bin direction. Alternatively, as shown in the lower part of FIG. 5, they may further include a total of eight bins further including the four bins located to the upper right, lower right, upper left, and lower left of the peak bin. The arrangement of the surrounding bins is not limited to these, and it suffices if one or more frequency bins existing within a preset range centered at the peak bin are included.

In step S200, the CPU 41 weights and adds the center matrix generated in step S180 and the surrounding matrices generated in step S190 for each peak bin to generate one averaged correlation matrix. This correlation matrix is referred to as an integrated matrix. As a result, P integrated matrices corresponding to the P peak bins are generated. In this integrated matrix, the values of the off-diagonal components of the integrated matrix representing the cross-correlation between channels are suppressed as compared with the individual center matrix and surrounding matrices. Further, the CPU 41 stores, in a preset storage area on the memory 42, the calculated integrated matrix in association with the two-dimensional bin that identifies the peak bin.

Figure 6:
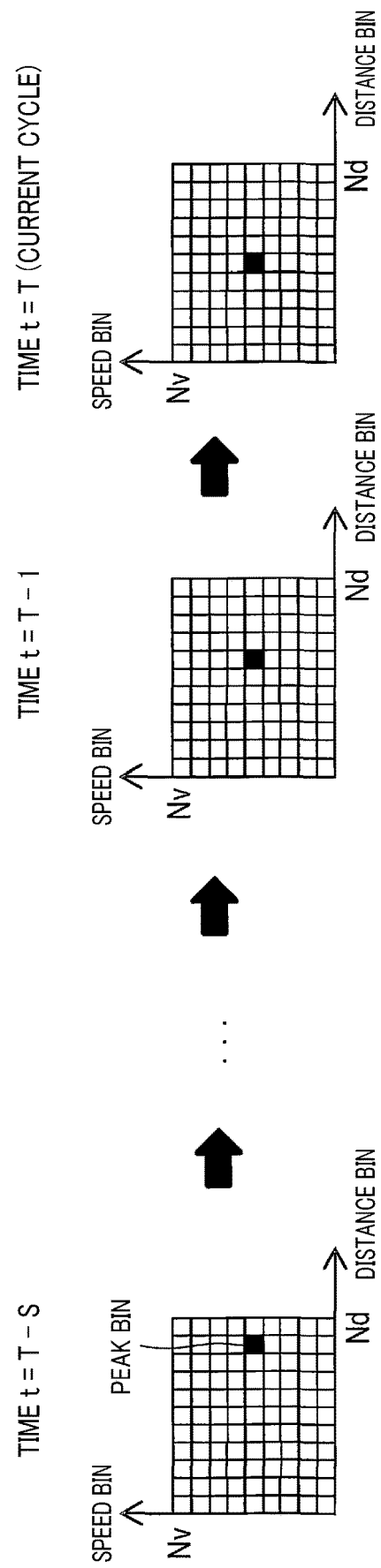
FIG. 6 is an illustration of peak bins to be time-averaged.

In step S210, the CPU 41 further suppresses the cross-correlation between channels by using time averaging for each of the P integrated matrices. Specifically, as shown in FIG. 6, in the tracking process of step S170, the peak bins for the past S cycles that are associated with the peak bin of interest are extracted, and the integrated matrices generated for the extracted peak bins are acquired. S is an integer greater to or equal to 1. Further, the obtained integrated matrices and the integrated matrix calculated in step S190 are weighted and added to generate a time-averaged integrated matrix.

Figure 7:
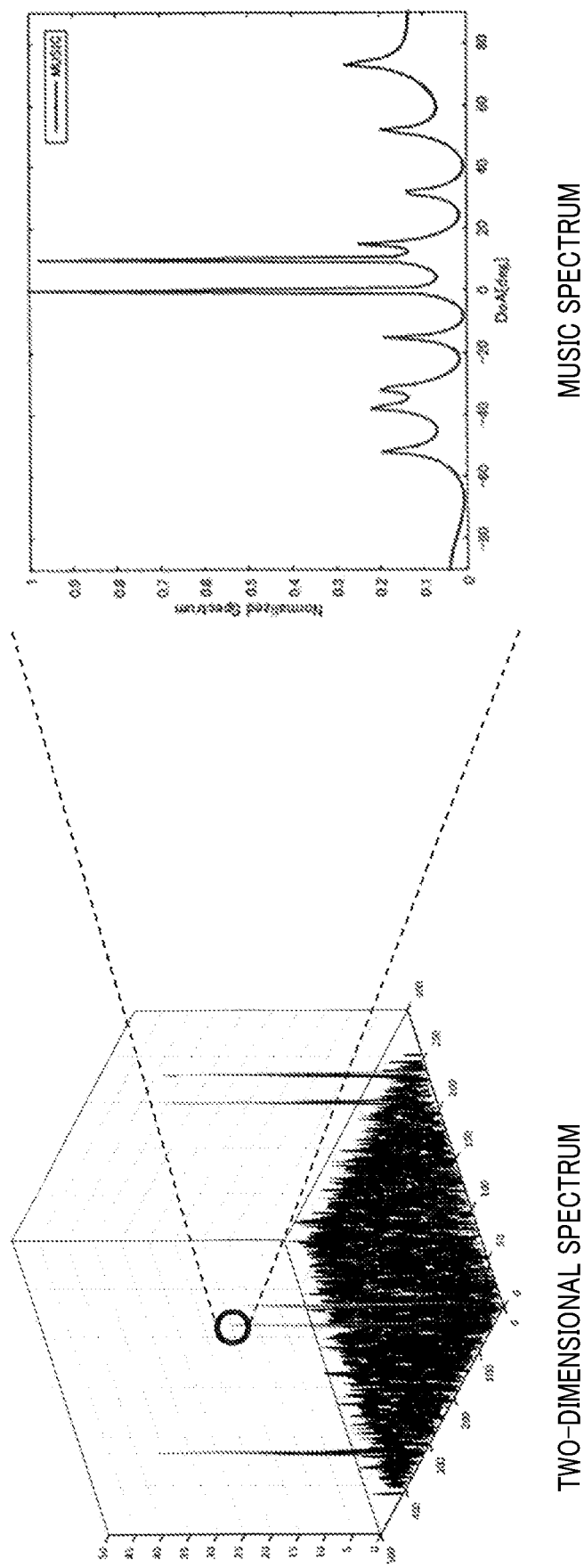
FIG. 7 is an explanatory diagram illustrating peak bins on a two-dimensional spectrum and a MUSIC spectrum obtained from one peak bin.

In step S220, the CPU 41 executes an azimuth estimation calculation such as MUSIC for each of the peak bins using the time-averaged integrated matrix generated in step S210. In this case, as shown in FIG. 7, a plurality of azimuths may be calculated from one peak bin. Therefore, the number of azimuths detected by the azimuth estimation calculation for each of the peak bins are summed, and the total number Q P) for all peak bins is the number of targets.

In step S230, the CPU 41 generates target information for each of the Q targets and ends the processing. The target information includes the distance calculated from the distance bin corresponding to the peak bin of interest, the relative speed calculated from the speed bin corresponding to the peak bin of interest, and the azimuth angle estimated using the correlation matrix of the peak bin of interest. The target information is distributed to various components of the vehicle via an in-vehicle LAN (not shown) to be used for various driving assistance controls.

FIG. 18 depicts a functional block diagram of the signal processing unit 4. The signal processing unit 4 includes an analysis unit 401 responsible for execution of an analysis step corresponding to steps S130 and S140, an extraction unit 402 responsible for execution of an extraction step corresponding to step S160, a center generation unit 404 responsible for execution of a center generation step corresponding to step S180, a surrounding generation unit 405 responsible for execution of a surrounding generation step corresponding to step S190, an integration unit 406 responsible for execution of an integration step corresponding to step S200, an estimation unit 408 responsible for execution of an estimation step corresponding to step S220, a storage unit 409 responsible for execution of step S200, a tracking unit 403 responsible for execution of step S170, and a time averaging unit 407 responsible for execution of step S210. These functional blocks are implemented by the CPU 41 executing computer programs stored in the memory.

3. Principle

The principle of suppressing the cross-correlation between channels by weighted addition of the center matrix and the surrounding matrices will be described below. Here, for simplicity, a case of a one-dimensional distance spectrum will be described instead of a two-dimensional spectrum.

Figure 8:
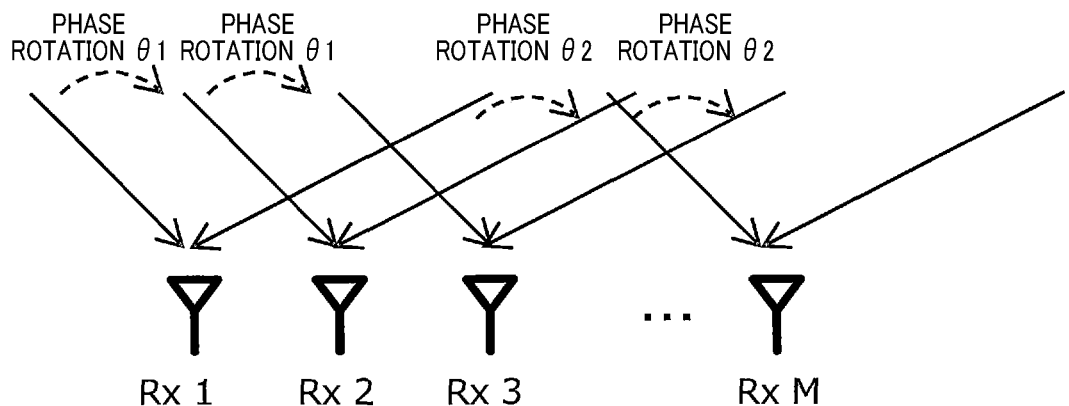
FIG. 8 is an illustration that the phase rotation between antennas based on reflected waves differs for each target.
Figure 9:
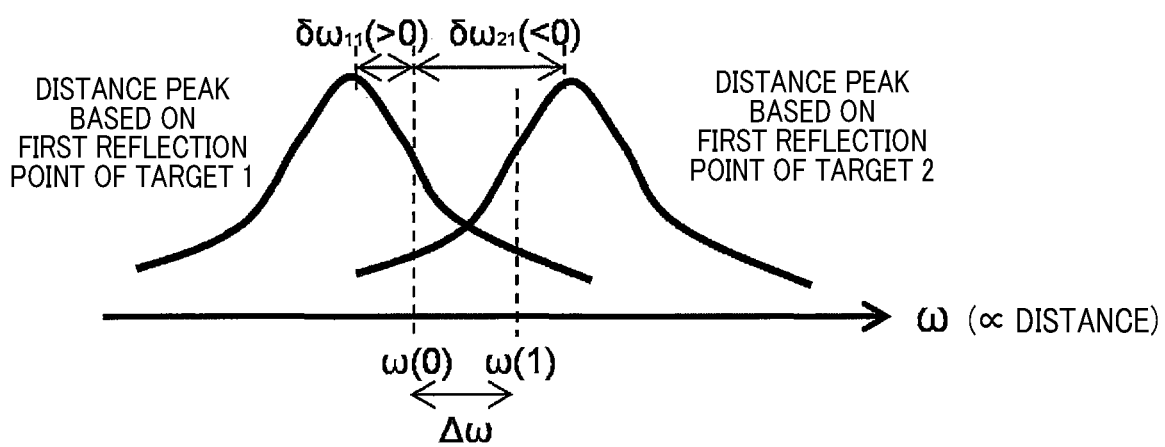
FIG. 9 is an illustration of peaks based on individual reflection points detected on a distance spectrum and parameters used to explain the principle.

A case is assumed where two targets are detected by M antennas arranged at equal intervals. It is assumed that the two targets are located at substantially equal distances, and the azimuths viewed from the antennas are slightly different from each other. A multi-point reflection model is applied to the targets. In general, when a vehicle, which is somewhat large, or the like is assumed as the target, multiple reflections are returned from one target, and therefore a multi-point reflection model is effective. That is, the reflection peak observed for one target is a combination of N reflection peaks from N reflection points. In addition, as shown in FIG. 8, reflected waves from N reflection points on the same target identified by i are incident on the M antennas from the same azimuth, and they produce a fixed amount of phase rotation θi between adjacent antennas. However, since the N reflection points have slightly different distances, on the distance spectra, the N reflection peaks based on the N reflection points vary probabilistically with the center at a certain distance bin determined for each target, as shown in FIG. 9.

Assuming that the window function filter response at a frequency that is different from the peak by δω is H(δω), the received signal vector xi(ω(0)) at an angular frequency ω(0) of the i-th target is expressed by Eq. (1). Each of the vectors shown in Eq. (1) includes the window function filter responses H(δωij) of M antennas as components arranged in order, each of them being a window function filter response of the signal from the j-th reflection point of the i-th target, and the vectors corresponding to the N reflection points are summed.

$$x_i(\omega(0)) = \sum_{j=1}^{N} [H(\delta\omega_{ij}), H(\delta\omega_{ij})e^{j\theta_i}, \ldots, H(\delta\omega_{ij})e^{j(M-1)\theta_i}]^T \quad (1)$$

This equation can be generalized so that the received signal vector xi(ω(k)) at an angular frequency ω(k) of the i-th target is expressed by Eq. (2).

$$x_i(\omega(k)) = \sum_{j=1}^{N} [a_{jk}H(\delta\omega_{ij})e^{jk\varphi}, a_{jk}H(\delta\omega_{ij})e^{jk\varphi}e^{j\theta_i}, \ldots, a_{jk}H(\delta\omega_{ij})e^{jk\varphi}e^{j(M-1)\theta_i}]^T \quad (2)$$

$$= e^{jk\varphi}\sum_{j=1}^{N} [a_{jk}H(\delta\omega_{ij}), a_{jk}H(\delta\omega_{ij})e^{j\theta_i}, \ldots, a_{jk}H(\delta\omega_{ij})e^{j(M-1)\theta_i}]^T$$

$a_{jk}$ is the amount of amplitude change in the filter response at ω(k) from ω(0), and $a_{j0}=1$. φ is the amount of phase change for each angular frequency step Δω of the filter response of the window function. However, since the window function has a linear phase characteristic, φ is constant.

Next, Eq. (3) represents a composite received signal x(ω(k)) obtained by combining the peak signals from two targets.

$$x(\omega(k)) = x_1(\omega(k)) \pm x_2(\omega(k)) \quad (3)$$

Using this equation, the component of the p-th row and the q-th column of the correlation matrix $R^{(k)}xx$ at an angular frequency ω(k) is obtained and reorganized so as to produce Eq. (4) (where p≠q).

$$R_{xx}^{(k)}(p, q) = x(\omega(k))x^H(\omega(k)) \quad (4)$$

$$= \left(\sum_{j=1}^{N} a_{jk}^2 |H(\delta\omega_{1j})|^2\right) e^{j(p-q)\theta_1} + \left(\sum_{j=1}^{N} a_{jk}^2 |H(\delta\omega_{2j})|^2\right) e^{j(p-q)\theta_2} +$$

$$\sum_{i=1}^{2}\left\{\left(\sum_{j'=1}^{N}\sum_{j=1,j\neq j'}^{N} a_{jk}H(\delta\omega_{ij})a_{j'k}H^*(\delta\omega_{ij'})\right)e^{j(p-q)\theta_i}\right\} +$$

$$\left(\sum_{j=1}^{N} a_{jk}H(\delta\omega_{1j})\right)\left(\sum_{j=1}^{N} a_{jk}H^*(\delta\omega_{2j})\right)e^{j(p-1)\theta_1}e^{-j(q-1)\theta_2} +$$

$$\left(\sum_{j=1}^{N} a_{jk}H(\delta\omega_{2j})\right)\left(\sum_{j=1}^{N} a_{jk}H^*(\delta\omega_{1j})\right)e^{j(p-1)\theta_2}e^{-j(q-1)\theta_1}$$

Using this equation, the correlation matrices of a total of K bins around the peak are added together to obtain the final correlation matrix Rxx expressed by Eq. (5).

$$R_{xx} = \sum_{k=1}^{K} R_{xx}^{(k)} \quad (5)$$

When the calculation of Eq. (5) is done, since the cross-correlation terms between the targets, which are shown in the third and following terms on the right-hand side of Eq. (4), may have positive or negative amplitudes, they approach zero by adding them up. On the other hand, the amplitude of the autocorrelation term of each target shown in the first term and the second term on the right-hand side of Eq. (4) is always positive, and the value increases unilaterally by adding them up. As a result, the cross-correlation between the incident waves in the correlation matrix is reduced. Thus, it can be seen that, when the target is represented by a multi-point reflection model, it is possible to reduce cross-correlation between channels by performing weighted addition of the center matrix, which is the correlation matrix of the peak bin, and the surrounding matrix, which is the correlation matrix of the surrounding bin.

Eq (6) represents the time averaging process of integrated matrices described in step S210. W(s) is the weight of the integrated matrix generated s cycles ago. As with the case of averaging using the correlation matrices of the surrounding bins, the cross-correlation terms are suppressed also in this case.

$$R_{xx\_fil}(T) = \sum_{s=0}^{S} W(s) * R_{xx}(T-s) \quad (6)$$

4. Advantages

According to the specific embodiment described above in detail, the following advantages can be obtained.

(4a) The azimuth estimation device 1 reduces the cross-correlation components of a correlation matrix by securing a certain number of snapshots of the correlation matrix using the surrounding bins adjacent to the peak bin and averaging them. Therefore, according to the azimuth estimation device 1, it is possible to reduce the cross-correlation components of a correlation matrix even when the modulation method used is a method such as FCM that is not compatible with time averaging which utilizes the FFT-processed result of each chirp. Further, according to the azimuth estimation device 1, since a certain number of snapshots can be secured without using spatial averaging, the cross-correlation components of the correlation matrix can be reduced even when an unevenly-spaced antenna array is used. As a result, according to the azimuth estimation device 1, it is possible to improve the accuracy of azimuth separation and the accuracy of azimuth estimation by azimuth estimation calculation using a correlation matrix such as MUSIC.

Figure 10:
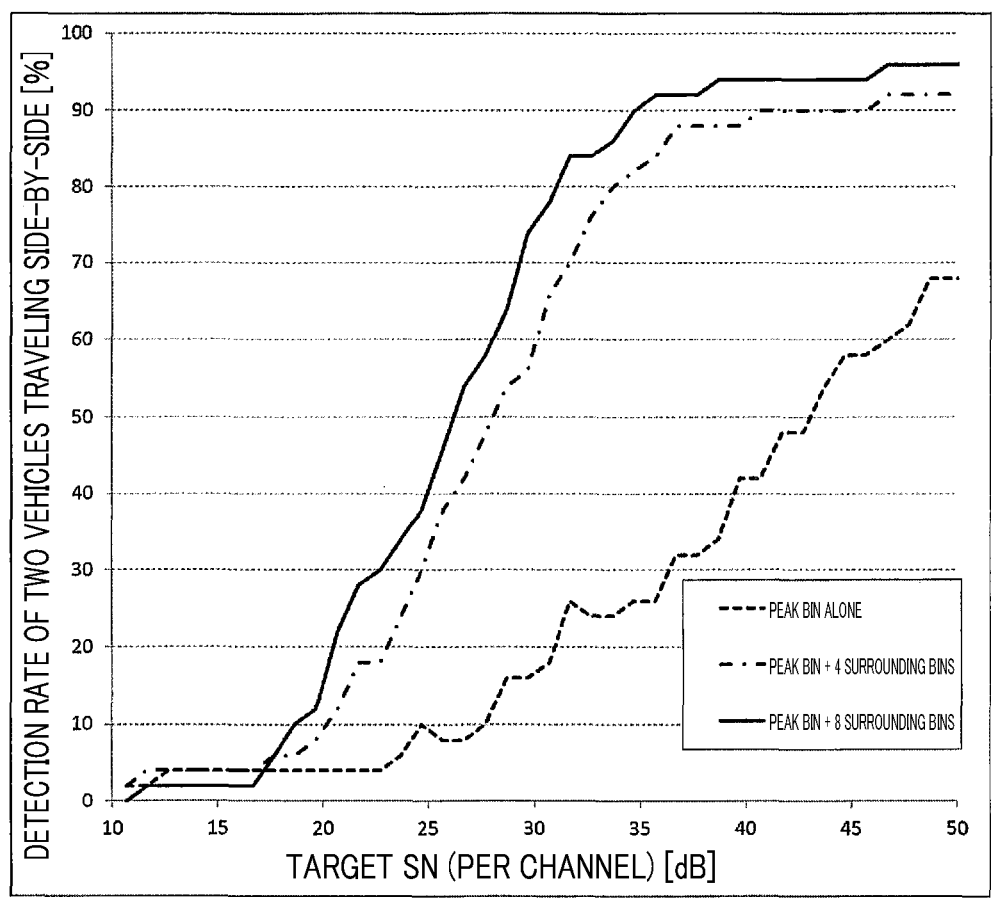
FIG. 10 is a graph showing the effect of suppressing the cross-correlation components of a correlation matrix by surrounding bins.

FIG. 10 shows results of simulation in which the detection rate of the target, representing two vehicles traveling parallel with each other, was determined changing the S/N of the target. MUSIC was used for the azimuth estimation calculation. The results are shown for a case where the correlation matrix was generated using only the peak bin, a case where the cross-correlation components of the correlation matrix was reduced by using four surrounding bins, and a case where the cross-correlation components of the correlation matrix was reduced by using eight surrounding bins. It can be seen from FIG. 10 that the cross-correlation components can be further reduced by increasing the number of surrounding pins used. However, when the range of the surrounding bins used is excessively widened, the result may be deteriorated due to an influence from another peak that does not overlap with it. Therefore, the range of the surrounding bins to be used may be set taking this into consideration.

(4b) The azimuth estimation device 1 performs tracking on the peak bin to extract peak bins based on the same target detected during the past S cycles, and time-averages the integrated matrices calculated for the extracted peak bins. As a result, the cross-correlation components of the correlation matrix used for the distance estimation calculation is suppressed. That is, if the change in the azimuth angle of the target during the measurement cycle Tf is sufficiently small with respect to the distance resolution of the azimuth estimation calculation, the cross-correlation components of the correlation matrix can be further suppressed by further applying this method. As a result, it is possible to further improve the accuracy of azimuth separation and the accuracy of azimuth estimation by the azimuth estimation calculation.

5. Other Embodiments

Embodiments for implementing the present disclosure have been described above, but the present disclosure is not limited to the above-described embodiments and can be implemented with various modifications.

(5a) In the above embodiment, a case has been described in which a correlation matrix is generated for a peak bin extracted from a two-dimensional spectrum, but the present disclosure is not limited to this. For example, it may be applied to a case where a correlation matrix is generated for a peak bin extracted from a distance spectrum.

(5b) In the above embodiment, a case where FCM is used as the modulation method, and where a range Doppler map which is a two-dimensional spectrum whose two-dimensional bins correspond to the distance and speed is generated has been described. However, the present disclosure is not limited to this. Any modulation method can be used as long as a range Doppler map can be obtained.

(5c) In the above embodiment, weighted addition is used as the operation for suppressing the cross-correlation components of the correlation matrix, but simple addition where all the weights are the same may be used.

(5d) In the above embodiment, a process of time-averaging the integrated matrices is executed in step S210, but this process may be omitted.

(5e) A plurality of functions realized by a single component of the above embodiment may be realized by a plurality of components, or a single function realized by a single component may be realized by a plurality of components. Further, a plurality of functions realized by a plurality of components may be realized by a single component, or a single function realized by a plurality of components may be realized by a single component. Furthermore, a part of the configuration of the above embodiments may be omitted. Furthermore, at least a part of the configuration of the above embodiment may be added or substituted in the configuration of the other embodiments described above.

(5f) The present disclosure can be implemented in various forms other than the above-described azimuth estimation method and azimuth estimation device. For example, it may be implemented as a system including the azimuth estimation device as a component, a program for causing a computer to function as the azimuth estimation device or for realizing the azimuth estimation method, a non-transitory tangible recording medium such as a semiconductor memory on which the program is recorded, and the like.

What is claimed is:

1. An azimuth estimation device comprising:
an antenna unit including a plurality of antennas; and
a transceiver unit configured to transmit and receive signals modulated by a Fast Chirp Modulation method via a plurality of transmitting/receiving channel which are combinations of one or more transmitting antennas and one or more receiving antennas, the one or more transmitting antennas being antennas of the antenna unit used for transmission of signals and the one or more receiving antennas being antennas of the antenna unit used for receipt of reflected signals, and to generate beat signals each representing a frequency difference between a transmission signal and a received signal;
a non-transitory memory storing one or more computer programs; and
a processor executing the one or more computer programs to:
generate for each of a plurality of transmitting/receiving channels, a two-dimensional spectrum represented by distance spectra obtained by frequency-analyzing the beat signals generated by the transceiver unit, for each of a plurality of chirps, and speed spectra obtained by frequency-analyzing, for each frequency bin of the distance spectra, the distance spectra over the chirps;
extract, as peak bins, peak frequency bins from generated two-dimensional spectra;
generate, for each extracted peak bin, a center matrix which is a correlation matrix obtained using values of the same peak bin collected from all of the transmitting/receiving channels;
generate, for each of one or more surrounding bins of each of the peak bins, a surrounding matrix which is a correlation matrix obtained using values of the same surrounding bin collected from all of the transmitting/receiving channels, the one or more surrounding bins of each peak bin being one or more frequency bins existing within a preset range centered at the corresponding peak bin;

generate, for each peak bin, an integrated matrix which is a correlation matrix obtained by weighting and adding the center matrix and the one or more surrounding matrices; and execute azimuth estimation calculation using the integrated matrix.

2. The azimuth estimation device according to claim 1, the processor further executes one or more computer programs to store, in a preset storage area of the non-transitory memory, the integrated matrices calculated over a plurality of processing cycles;

associate, over the processing cycles, the peak bins that are estimated to be based on a same object with each other; and perform weighted addition of the integrated matrices for the peak bins associated with each other, and execute the azimuth estimation calculation using the integrated matrix obtained from the weighted addition.

3. The azimuth estimation device according to claim 1, wherein the antennas of the antenna unit a arranged at uneven intervals.

4. A computer-implemented azimuth estimation method comprising:

acquiring beat signals from a transceiver unit, the transceiver unit being configured to transmit and receive signals modulated by a Fast Chirp Modulation method via a plurality of transmitting/receiving channels which are combinations of one or more transmitting antenna and one or more receiving antenna, the one or more transmitting antennas being antennas of an antenna unit used for transmission of signals and the one or more receiving antennas being antennas of the antenna unit used for receipt of reflected signals, and to generate the beat signals each representing a frequency difference between a transmission signal and a received signal;

generating, for each of the plurality of transmitting/receiving channels, a two-dimensional spectrum represented by distance spectra obtained by frequency-analyzing the beat signals generated by the transceiver unit, for each of a plurality of chirps, and speed spectra obtained by frequency-analyzing, for each frequency bin of the distance spectra, the distance spectra over the chirps;

extracting, as peak bins, a peak frequency bins from the generated two-dimensional spectra;

generating, for each extracted peak bin, a center matrix which is a correlation matrix obtained using values of the same peak bin collected from all of the transmitting/receiving channels;

generating, for each of one or more surrounding bins of each of the peak bins, a surrounding matrix which is a correlation matrix obtained using values of the same surrounding bin collected from all of the transmitting/receiving channels, the one or more surrounding bins of each peak bin being one or more frequency bins existing within a preset range centered at the corresponding peak bin;

generating, for each peak bin, an integrated matrix which is a correlation matrix obtained by weighting and adding the center matrix and the one or more surrounding matrices; and executing azimuth estimation calculation using the integrated matrix.

* * * * *